Nov. 23, 1965　　　　　G. VASU　　　　　3,218,801
NORMAL SHOCK POSITIONING APPARATUS

Filed Nov. 8, 1963　　　　　　　　　　　　2 Sheets-Sheet 1

SHOCK LOCATION

INVENTOR.
GEORGE VASU
BY
ATTORNEYS

INVENTOR.
GEORGE VASU
BY
ATTORNEYS

United States Patent Office 3,218,801
Patented Nov. 23, 1965

3,218,801
NORMAL SHOCK POSITIONING APPARATUS
George Vasu, 37825 Lorie Blvd., Avon, Ohio
Filed Nov. 8, 1963, Ser. No. 322,560
13 Claims. (Cl. 60—35.6)
(Granted under Title 35, U.S. Code (1952), sec. 266)

The invention described herein may be manufactured and used by or for the Government of the United States of America for governmental purposes without the payment of any royalties thereon or therefor.

The invention relates generally to supersonic diffusers and, more particularly, to a control for positioning of the normal shock within the diffuser.

In engines employing the turbo-jet or ram-jet principles for propelling supersonic aircraft for example, it is highly desirable to have these engines operate at maximum thrust and minimum fuel consumption for maximum economy over long flight operation. The efficiency of the engine is not only dependent upon its thermodynamic characteristics but also its aerodynamic design. In order to compress and slow down the incoming air, a diffuser is inserted or positioned in the inlet of a jet engine. Where the flow of the air in the diffuser changes from supersonic to subsonic, a shock wave occurs. The position of the shock wave in the inlet section is a function of Mach number, fuel flow rate, and other parameters. For a given engine-inlet design an optimum position of the normal shock wave can be selected for minimum fuel consumption. If the position of the shock wave changes from this optimum position, the efficiency realized from the engine would be decreased. Thus, it becomes desirable to maintain the position of the normal shock wave at a predetermined position in order to maintain maximum efficiency in flight performance.

It is known that the pressure in the combustion chamber of a ram-jet engine is a function of fuel flow at fixed operating flight conditions. From aerodynamic theory for supersonic flight the position of the normal shock wave is a function of the engine inlet pressure and the pressure in the combustion chamber. For a predetermined inlet condition, it follows that the normal shock position is a function of fuel rate. By controlling the fuel rate and thus the pressure in the combustion chamber, the position of the normal shock wave is determined. Methods and devices to accomplish the aforementioned shock wave position determination results in a multiude of pressure measuring devices fed into electrical or mechanical means to control the fuel flow whereby the fuel flow is a function of combination of the pressures being measured. This results in cumbersome instrumentation and other problems during flight. Further, the reliability and response of these methods and devices decrease with both complexity of the system and the greater number of components.

Accordingly, an object of the invention is to provide a system to position the normal shock wave in an engine-inlet operation.

Another object of the instant invention is to provide a fuel control system for an engine-inlet which is relatively simple.

The foregoing objects of the invention are obtained by placing a sensing probe at the location where the normal shock wave is to be maintained during supersonic flight conditions. The probe measurement is converted into an electrical or mechanical signal which is then filtered to remove the average or direct current (D.C.) component of the probe measurement and any unwanted frequencies thus providing a signal which is equivalent to the noise level due to pressure oscillation at the point of measurement within the engine. This signal will hereinafter be referred to as the primary signal. The primary signal is then rectified and subsequently filtered to smooth out the rectified signal. The rectified and smoothed primary signal is then compared with a predetermined signal which results in an error signal. The error signal actuates a mechanism to increase or decrease the fuel rate thus maintaining the position of the normal shock wave at the location of the probe.

Other objects and a fuller understanding of the invention may be had by referring to the following description and claims, taken in conjunction with the accompanying drawings, in which:

Figure 1:
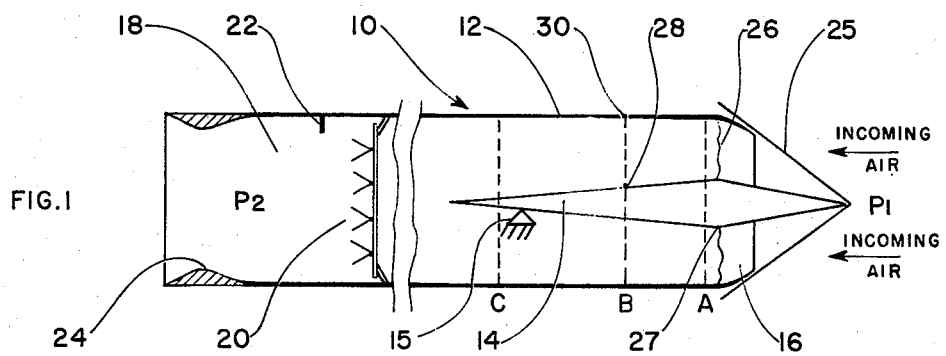
FIG. 1 is a schematic view of a ram-jet engine with a diffuser in the inlet section.

Referring now to FIG. 1, there is shown a ram-jet engine 10. As illustrated, the engine 10 comprises a duct-like member 12 within which a centerbody 14 is coaxially mounted at the forward end by struts 15 schematically represented. The centerbody 14 is disposed at the forward end of the duct member 12 to provide an annular air inlet passage 16. The duct member 12 has a combustion chamber 18 having a fuel injection system, schematically indicated at 20. Fuel for combustion with air entering the inlet 16 is injected into the combustion chamber 18 by means of the fuel injection system 20. It is simultaneously mixed with the incoming air in the combustion chamber 18 and ignited by a hot plug 22 or by the environmental temperature of the combustion chamber. An exhaust nozzle 24 is provided at the rear of the duct member 12 through which exhaust gases from the combustion chamber discharge to the rear into the surrounding atmosphere.

The thrust of a jet engine increases with an increase of the rate at which the air enters the engine and the more efficiently the air is introduced into the engine the lower the specific fuel consumption (fuel consumption per unit thrust output) of the engine. It is desirable, therefore, that an engine operate so that there is as high a conversion as possible of the air inlet entry velocity to pressure; that is, at as high a pressure recovery of the inlet as possible. At supersonic flight speeds air enters the engine inlet 16 at supersonic velocity but the velocity entering the engine combustion chamber 18 is subsonic. Accordingly, an oblique shock wave 25 exists at the diffuser tip and a normal shock wave 26 exists in the inlet at the transition region from supersonic to subsonic flow and, in general, this shock wave is at or downstream from the inlet throat 27. For a given speed or Mach number and flight altitude, the pressure $P_1$ at the inlet region is relatively constant. Therefore, the position of the normal shock wave from aerodynamic theory will depend upon the pressure $P_2$ in the combustion chamber 18. From thermodynamic relationships, the pressure $P_2$ is dependent upon the rate the fuel enters the combustion chamber. For a high fuel rate in supersonic flight, the position of the normal shock wave will be at A. As the fuel rate is decreased, but maintaining the same Mach number and altitude, the normal shock wave will traverse the diffuser area from A to B and then to C.

Figure 2:
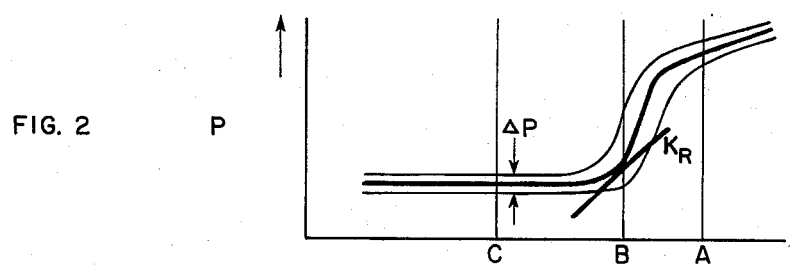
FIG. 2 is a graphic representation of the pressure variation for positions of the normal shock wave in the diffuser inlet of a ram-jet engine at a particular probe location.
Figure 3:
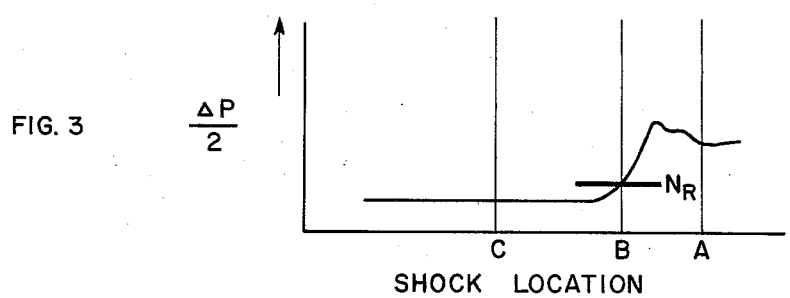
FIG. 3 is a graphic representation of the noise variation for positions of the normal shock wave in the diffuser inlet of a ram-jet engine at a particular probe location.

The pressure for each location of the normal shock wave as sensed by a pressure tap at station B is shown in FIG. 2. For each location of the normal shock wave there is a steady state component of pressure P and a variation of pressure ΔP which is referred to as noise. The noise amplitude ΔP/2 is shown as a function of shock location along the centerbody 14 in FIG. 3, again as sensed by a pressure tap at station B.

The optimal location of the normal shock wave in an engine is determined by aerodynamic design considerations taking into account the geometry of the engine and the flight conditions at which the engine is to operate. For purposes of example, it will be assumed that the optimal location of the normal shock wave is at B. To maintain the normal shock wave at this location, a pressure probe to measure static pressure is placed on the centerbody 14 at 28 or on the duct section 12 at 30 (FIG. 1). For this purpose, a static pressure tap or a reverse total pressure probe may be used.

Figure 4:
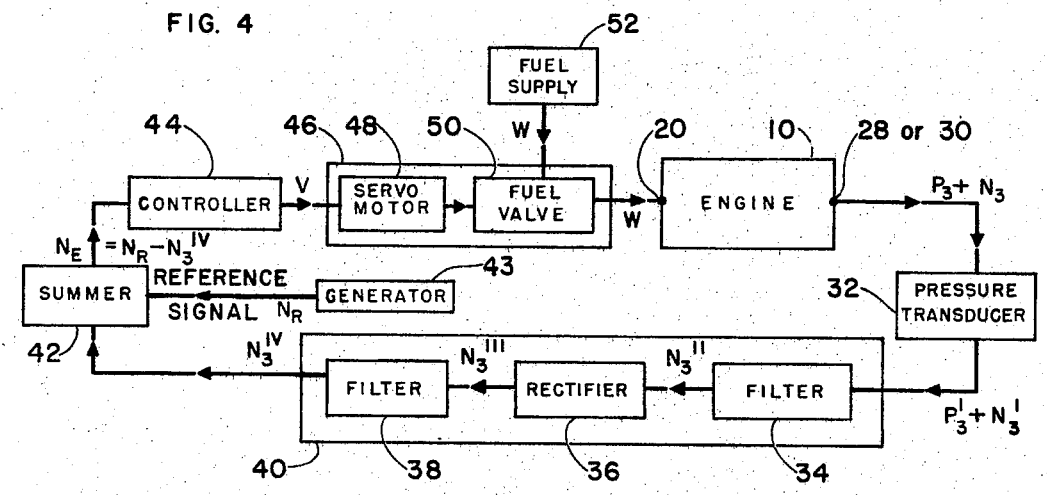
FIG. 4 is a schematic block diagram of the normal shock wave control system invention.

The pressure value may be utilized as a control as better shown with respect to FIG. 4. The pressure tap or probe is connected to a pressure transducer 32. The combination of the probe and transducer can be considered as a pressure sensor. The transducer is connected to a first filter 34 which is a band pass filter and hereinafter referred to as such. The band pass filter 34, a rectifier 36 and a second filter 38 which is a low pass filter and hereinafter is referred to as such, are serially connected to form a noise amplitude computer 40. The noise amplitude computer 40 is connected to a summer 42 which in turn is connected to a controller 44. The controller 44 is connected to a fuel-servo system 46 which consists of a servo motor 48 integrally connected to a fuel valve 50. The fuel valve 50 is interconnected between a fuel supply 52, and the fuel injection system 20 in the engine 10.

In operation, the pressure tap or probe at 28 or 30 on the diffuser 14 or duct member 12 respectively senses the pressure which consists of the steady state value $P_3$ plus the noise $N_3$ at station B. The pressure transducer 32 connected directly to the pressure probe converts the pressure signal to electrical equivalent $P_3'$ plus an electrical equivalent of noise $N_3'$. The $P_3'+N_3'$ signal is fed into the noise amplitude computer 40. In the noise amplitude computer 40 the signal $P_3'+N_3'$ is fed into the pass band filter 34 which removes the steady state signal $P_3'$ and any unwanted frequencies leaving the AC noise signal $N_3''$. The aforesaid signal then passes to the rectifier 36 and is rectified producing the rectified signal $N_3'''$. This signal passes into the lowpass filter 38 which smooths the rectified signal $N_3'''$ producing a signal $N_3^{IV}$ which passes to a summer 42. Simultaneously, a reference signal $N_R$ from generator 43 which is the electrical equivalent of the experimentally measured noise amplitude at station B when the normal shock wave is located there is sent to the summer 42. The summer 42 combines the signals $N_3^{IV}$ and $N_R$ to an error signal $N_E = N_R - N_3^{IV}$. The error signal $N_E$ passes into a controller 44 which produces an electrical signal V which increases or decreases the fuel rate as required to maintain the normal shock wave at station B. The servo motor 48 is actuated by the electrical signal V which in turn further opens or closes the fuel valve 50 allowing for an increase or decrease in fuel rate W from fuel supply 52 flowing through fuel valve 50 to the fuel injection system 20 in engine 10.

The lowpass filter 38 can be bypassed during operation resulting in the rectified signal $N_3'''$ being fed to the summer 42. The remainder of the system would operate in the manner previously described.

To illustrate the type of instruments utilized in the invention, the diffuser pressure can be measured by a variable inductance type of pressure transducer. The tubing connecting the transducer to the pressure probe in the engine should, in general, be made as short as possible to reduce dynamic effects.

The first filter 34, for operation and for use in the present invention is a band pass filter which can have the following characteristics. The gain should be approximately unity in the pass band. On each side of the pass band the attenuation should be about 24 decibels per octave. The transfer function of the filter is as follows:

$$\frac{\omega_4 \tau_1^4}{(1+2jA\omega\tau_1-\omega^2\tau_1^2)^2 \; (1+2jA\omega\tau_2-\omega^2\tau_2^2)^2}$$

where $\omega$ = frequency, radians per second
$\tau$ = time constant of integral control, seconds
A = constant
$j = \sqrt{-1}$ where the low cut-off frequency is $\frac{1}{2}\pi\tau_1$, the high cut-off frequency is $\frac{1}{2}\pi\tau_2$, and the factor A is slightly greater than 0.6.

The rectifier 34 may consist of four germanium rectifiers connected in a bridge circuit providing for full-wave rectification.

The second filter can be a low pass filter 38 capable of smoothing the rectified signal and may have the characteristic of a simple lag with the transfer function $$\frac{K_1}{1+\tau_3 S}$$

where the gain $K_1$ is unity and the time constant $\tau_3$ is set to achieve as much filtering as possible consistent with permitting the desired response. S is a complex variable equal to $\Sigma + j\omega$.

The summer 42 may be a summing amplifier of the analog computer type or simply a resistor summing network.

The controller 44 can be a proportional-plus-integral controller which gives additional flexibility over a simple proportional controller or integral controller. Experience has indicated that this type of control is suitable for a wide variety of systems.

The transfer function of this type of controller 44 is $$K_2\left(1+\frac{1}{\tau_4 S}\right)$$

The fuel servo 46 consisted of an electrohydraulic servosystem 48 which positions a fuel valve 50 in response to an input-voltage signal.

The preceding components are given by way of example only, and the invention is not limited to the use solely of them.

Figure 5:
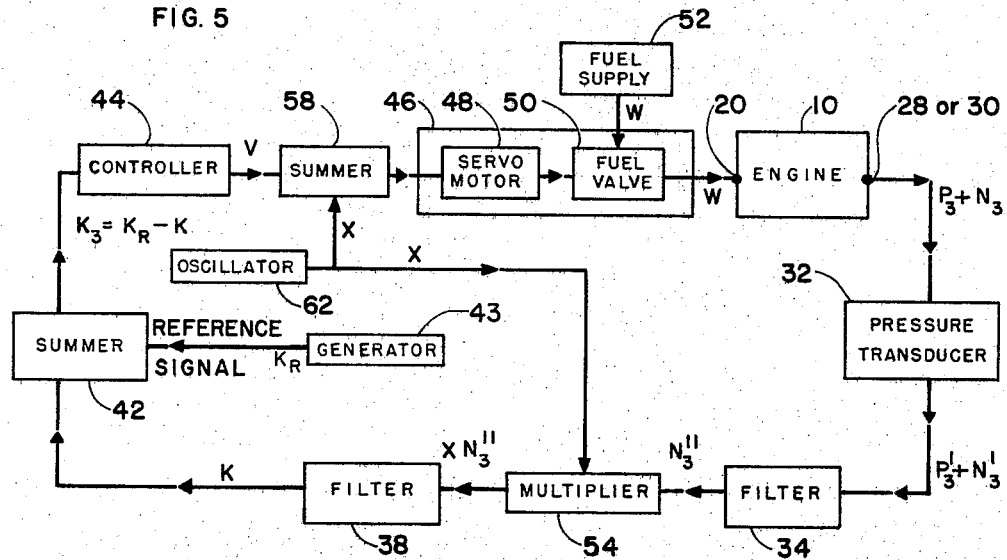
FIG. 5 is a schematic block diagram of a modification of the normal shock wave control system invention.

The invention described hereinabove is extremely versatile and can be readily modified. Referring to FIG. 5, one such modification is to replace the rectifier 36 (FIG. 4) in the noise amplitude computer 40 with a multiplier 54. The multiplier is interconnected between the first filter 34 and the second filter 38. A second summer 58 is interconnected between the controller 44 and fuel-servo system 46. Connected to summer 58 and multiplier 54 is an oscillator 62.

In operation, the pressure $P_3+N_3$, measured in the engine 10 at location 28 or 30, is fed into pressure transducer 32 providing the signal $P_3'+N_3'$ as previously described. This signal passes into first filter 34. The steady state component $P_3'$ of the signal passing into first filter 34 is removed together with any unwanted frequencies, transmitting to multiplier 54 the A.C. signal $N_3''$. The amplitude of the signal $N_3''$ is a function of fuel flow W. The oscillator 62 emits a signal X to the multiplier 54 and summer 58. The multiplier produces a product signal $XN_3''$ which is indicative of the gain of the pressure-fuel flow characteristics. For a given flight condition, the signal is then fed into the low pass filter 38 which smooths the signal and eliminates certain unwanted signals remaining and emitting the signal K. The smoothed signal K passes to the summer 42. Simultaneously, a reference signal $K_R$, which is a value of the experimental slope of the pressure-fuel flow characteristics for a pressure measured at location B is sent to the summer 42 from generator 43. The value of the signal $K_R$ is chosen as mentioned hereinbefore with reference to FIG. 3. The summer 42 combines the signals K and $K_R$ to produce an error signal $K_E = K_R - K$. The error signal $K_E$ passes into a controller 44 which as previously described produces an electrical signal V which combines with the oscillator output X to vary the fuel rate as required to maintain the normal shock wave at location B by actuating fuel servo 46.

In actual operation, the first and second filter 34 and 38 can be of the band pass and low pass types, respectively, as previously described.

The oscillator 62 can be a simple, standard, sinusoidal waveform generator.

The multiplier 54 may be, for example, a pulse-width, pulse-height modulation type of multiplier with a bandwidth of approximately 1000 cycles per second and, therefore, produce negligible amplitude and phase error at pertinent control frequencies for many applications.

It should be understood that the preceding components are given by way of example only and the invention is in no way limited to them.

For variations required in flight operation, pressure taps can be located along the diffuser 14 at desired positions of the normal shock wave for altitude-Mach number combinations. Various switching arrangements can be incorporated by one skilled in the art to actuate the appropriate pressure probe for a given Mach number and altitude and simultaneously actuate a reference signal $N_R$ or $K_R$ for the appropriate flight conditions.

While the invention described herein is described in detail in its present preferred embodiment, it will be obvious to those skilled in the art after understanding the invention that various changes and modifications may be made therein without departing from the spirit or scope thereof. It is the intention therefore to be limited only as indicated by the scope of the following claims.

What is claimed is:

1. A control apparatus for an engine having an inlet having a throat portion adjacent to its upstream end through which air enters the engine at supersonic velocity for combustion therein during engine operation, said apparatus comprising means for measuring the air pressure after entry into said inlet, said pressure having an average and alternating component, means to eliminate said average component, means responsive to said alternating component for producing a first signal which is a function of normal shock wave location, means for supplying a reference signal, means for comparing said first signal to said reference signal thereby producing an error signal, and means for utilizing said error signal to control fuel flow rate to said engine.

2. A control apparatus for an engine having an inlet with a throat portion adjacent to its upstream end and through which air enters at supersonic velocity for combustion therein during engine operation, said apparatus comprising means for measuring the air pressure after entry into the inlet, said pressure having an average and alternating component, means for eliminating said average component of said pressure, means for rectifying said alternating component of said pressure, means for supplying a reference signal, means for comparing said rectified component of said pressure and said reference signal producing an error signal, and means for utilizing said error signal to control fuel flow rate to the engine.

3. A control apparatus for an engine having an inlet having a throat portion adjacent to its upstream end through which air enters the engine at supersonic velocity for combustion therein during engine operation comprising means for measuring static air pressure after inlet, means for converting said measured pressure to a first electrical signal having a direct and alternating component of current, filter means for eliminating said direct current component of said first electrical signal producing thereby a second electrical signal, means for rectifying said second electrical signal, means for supplying a reference signal, summing means for adding said second signal to said reference signal producing thereby an error signal, and means for utilizing said error signal to control fuel flow rate to said engine.

4. A control apparatus for an engine having an inlet having a throat portion adjacent to its upstream end through which air enters the engine at supersonic velocity for combustion therein during engine operation comprising means for measuring static air pressure after inlet, means for converting said measured pressure to a first electrical signal said first electrical signal having a direct and alternating component of current, first filter means for eliminating said direct current component of said first electrical signal producing thereby a second electrical signal, means for producing an alternating electrical signal, means for combining said second electric signal with said alternating electric signal producing thereby a third electric signal, means for supplying a reference signal, summing means for adding said third electric signal to said reference signal producing thereby an error signal, and means for utilizing said error signal to control fuel flow rate to the engine.

5. A control apparatus for an engine having an inlet having a throat portion adjacent to its upstream end through which air enters the engine at supersonic velocity for combustion therein during engine operation, said apparatus comprising a pressure sensor in the inlet region of said engine, a noise amplitude computer connected to said pressure sensor, a summer connected to said noise amplitude computer, means for supplying a reference signal to said summing amplifier, a controller connected to said summer, and a fuel-servo system to supply fuel to said engine interconnected between said engine and said controller, said fuel-servo system being controlled by said controller.

6. Apparatus as claimed in claim 5 wherein said noise amplitude computer comprises a band pass filter and rectifier electrically connected.

7. Apparatus as claimed in claim 5 wherein said noise amplitude computer comprises a band pass filter electrically connected to a low pass filter and a rectifier interconnected between said band pass filter and said low pass filter.

8. Apparatus as claimed in claim 5 wherein said fuel-servo system comprises a servo motor and a fuel valve operatively connected.

9. Apparatus as claimed in claim 5 wherein said pressure sensor comprises a pressure tap and a pressure transducer operatively interconnected.

10. A control apparatus for an engine having an inlet having a throat portion adjacent to its upstream end through which air enters the engine at supersonic velocity for combustion therein during engine operation, said apparatus comprising a pressure sensor in the inlet region of said engine, a band pass filter connected to said pressure sensor, a multiplier connected to said band pass filter, a first summer connected to said multiplier, means for supplying a reference signal to said first summer, a controller connected to said summer, a fuel-servo system to supply fuel to said engine interconnected between said engine and said controller, a second summer interconnected between said controller and said fuel-servo system, an oscillator interconnected between said second summer and said multiplier, whereby said fuel-servo system is controlled by a signal from said summer.

11. An apparatus as claimed in claim 10 having a low pass filter interconnected between said multiplier and said first summing amplifier.

12. Apparatus as claimed in claim 10 wherein said fuel-servo system comprises a servo motor and a valve operatively connected.

13. Apparatus as claimed in claim 10 wherein said pressure sensor comprises a pressure tap and pressure transducer operatively interconnected.

References Cited by the Examiner
UNITED STATES PATENTS

| | | | |
|---|---|---|---|
| 3,029,633 | 4/1962 | Bauer | 60—35.6 |
| 3,102,387 | 9/1963 | Caspar | 60—35.6 |

MARK NEWMAN, *Primary Examiner.*